US012626457B1

(12) United States Patent
McCombe

(10) Patent No.: US 12,626,457 B1
(45) Date of Patent: May 12, 2026

(54) VIEW-INVARIANT EDGE FILTERING FOR ELECTRONIC DEVICES

(71) Applicant: Apple Inc., Cupertino, CA (US)

(72) Inventor: James A. McCombe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 18/584,976

(22) Filed: Feb. 22, 2024

Related U.S. Application Data

(60) Provisional application No. 63/454,942, filed on Mar. 27, 2023.

(51) Int. Cl.
| | |
|---|---|
| *G06T 17/00* | (2006.01) |
| *G06F 3/01* | (2006.01) |
| *G06F 3/04815* | (2022.01) |
| *G06F 3/14* | (2006.01) |
| *G06T 3/14* | (2024.01) |
| *G06T 5/20* | (2006.01) |

(52) U.S. Cl.
CPC .............. *G06T 17/00* (2013.01); *G06F 3/013* (2013.01); *G06F 3/04815* (2013.01); *G06F 3/14* (2013.01); *G06T 5/20* (2013.01)

(58) Field of Classification Search
CPC ....... G06T 17/00; G06T 17/005; G06T 17/05; G06T 17/20; G06T 15/00; G06T 15/04;

G06T 15/205; G06T 15/10; G06T 5/20; G06F 3/011; G06F 3/012; G06F 3/013; G06F 3/014; G06F 3/017; G06F 3/04815; G06F 3/14
See application file for complete search history.

(56) References Cited

U.S. PATENT DOCUMENTS

| | | | | |
|---|---|---|---|---|
| 11,521,273 B2 * | 12/2022 | Jakka | ................. | G06Q 30/0205 |
| 11,972,164 B2 * | 4/2024 | Hulbert | .............. | G06F 3/04886 |
| 12,282,599 B1 * | 4/2025 | Holling | ................. | G06F 3/013 |
| 2021/0191600 A1 * | 6/2021 | Lemay | .................... | G06F 3/013 |
| 2021/0279852 A1 * | 9/2021 | Jakka | .................... | G06T 7/0002 |
| 2021/0357169 A1 * | 11/2021 | Hulbert | ................. | G06F 3/0482 |

OTHER PUBLICATIONS

"The SDF of a box," webpage https://www.youtube.com/watch?v=62-pRVZuS5c, 1 page, Oct. 10, 2019, retrieved from https://www.youtube.com/watch?v=62-pRVZuS5c on Apr. 4, 2024.
"Rounding corners in SDFs," webpage https://www.youtube.com/watch?v=s5NGeUV2EyU, 1 page, Nov. 1, 2019, retrieved from https://www.youtube.com/watch?v=s5NGeUV2EyU on Apr. 4, 2024.

* cited by examiner

*Primary Examiner* — Vijay Shankar
(74) *Attorney, Agent, or Firm* — BAKERHOSTETLER

(57) ABSTRACT
View-invariant edge filtering is provided. In one or more implementations, view-invariant edge filtering may provide anti-aliasing that is effective in reducing or eliminating perceivable aliasing across various different viewing configurations of display content, including foveated rendering configurations and/or viewing configurations in which display content is moveable and rotatable in three virtual dimensions.

21 Claims, 7 Drawing Sheets

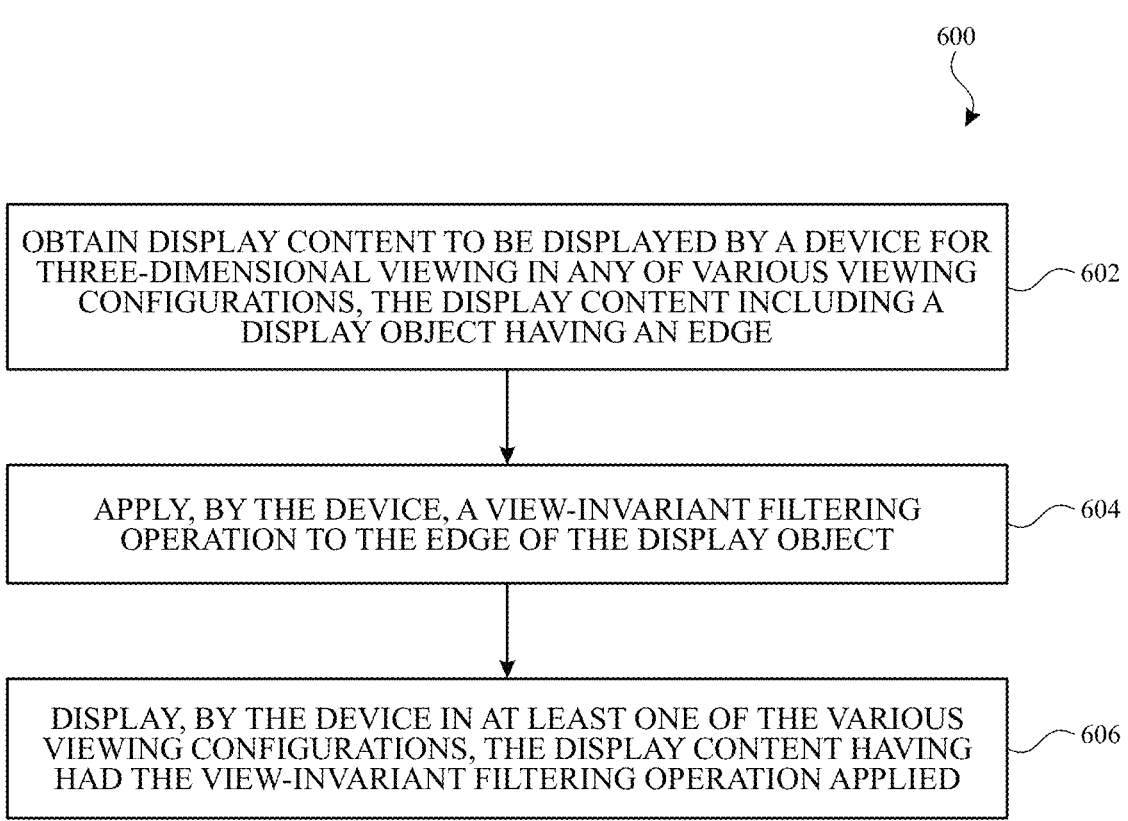

600

OBTAIN DISPLAY CONTENT TO BE DISPLAYED BY A DEVICE FOR THREE-DIMENSIONAL VIEWING IN ANY OF VARIOUS VIEWING CONFIGURATIONS, THE DISPLAY CONTENT INCLUDING A DISPLAY OBJECT HAVING AN EDGE — 602

APPLY, BY THE DEVICE, A VIEW-INVARIANT FILTERING OPERATION TO THE EDGE OF THE DISPLAY OBJECT — 604

DISPLAY, BY THE DEVICE IN AT LEAST ONE OF THE VARIOUS VIEWING CONFIGURATIONS, THE DISPLAY CONTENT HAVING HAD THE VIEW-INVARIANT FILTERING OPERATION APPLIED — 606

*FIG. 6*

VIEW-INVARIANT EDGE FILTERING FOR ELECTRONIC DEVICES

CROSS REFERENCE TO RELATED APPLICATIONS

This application claims the benefit of priority to U.S. Provisional Patent Application No. 63/454,942, entitled, "View-Invariant Edge Filtering for Electronic Devices", filed on Mar. 27, 2023, the disclosure of which is hereby incorporated herein in its entirety.

TECHNICAL FIELD

The present description relates generally to electronic devices including, for example, view-invariant edge filtering for electronic devices.

BACKGROUND

Electronic devices typically utilize arrays of display pixels to present display content. Displaying boundaries in the display content with the display pixels can result in a visual artifact, often referred to as aliasing, in which the boundaries that are intended to appear smooth instead appear jagged or stepped according to the physical features of the display pixels. If the boundary is moved while being displayed, this aliasing at the boundary can also cause a user to perceive an undesirable "crawling" artifact as pixels near the boundary are turned on or off with the motion of the boundary across the display pixels.

BRIEF DESCRIPTION OF THE DRAWINGS

Certain features of the subject technology are set forth in the appended claims. However, for purpose of explanation, several implementations of the subject technology are set forth in the following figures.

FIG. 6 illustrates a flow diagram of an example process for view-invariant edge filtering in accordance with aspects of the subject technology.

DETAILED DESCRIPTION

Figure 1:
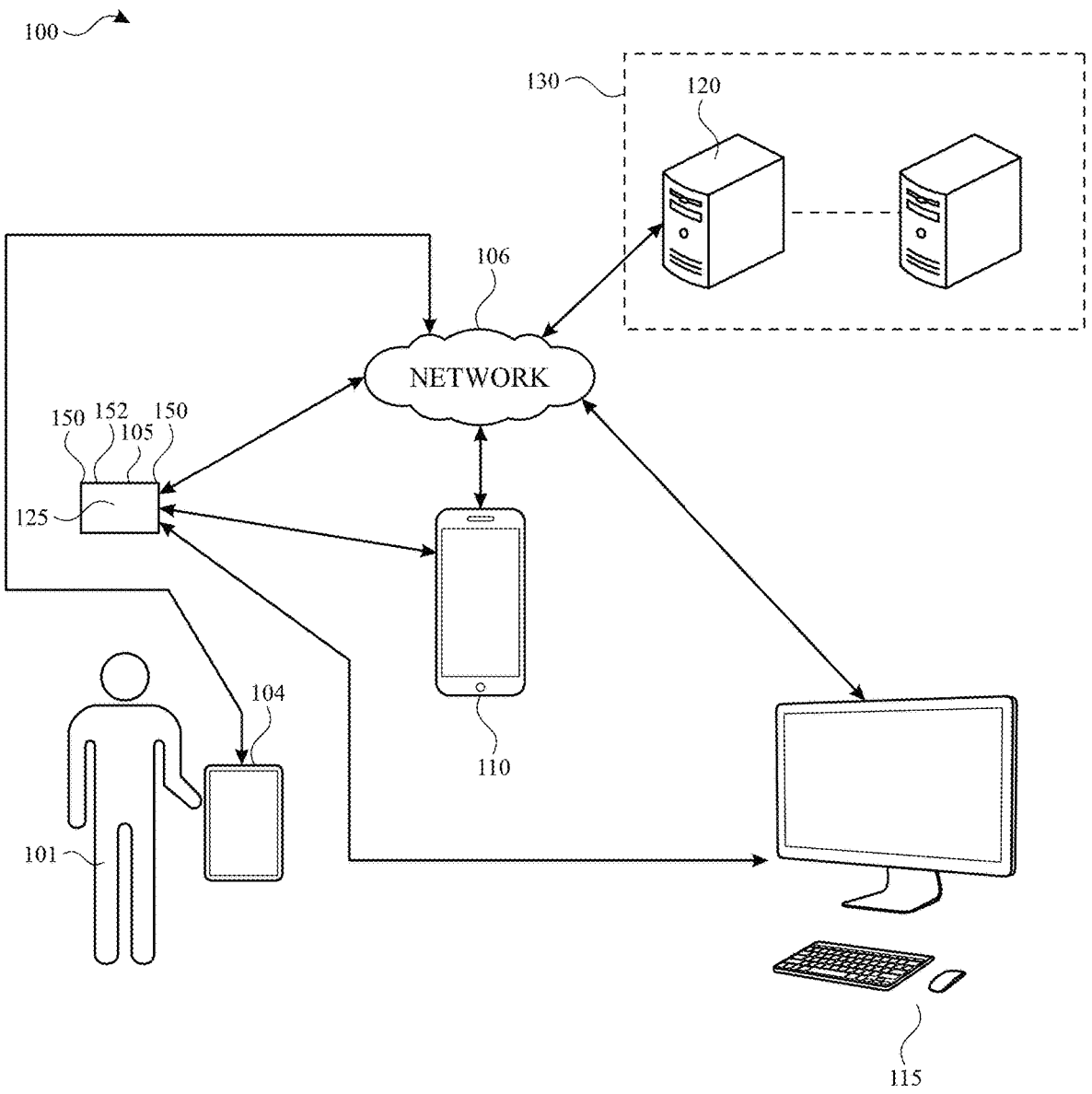
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Existing anti-aliasing solutions, such as multi-sample anti-aliasing (MSAA), may be insufficient to address aliasing and/or other edge artifact issues in some viewing configurations with which display content can be displayed by an electronic device. As examples, foveated rendering of display content can exacerbate a user's perception of aliasing and/or other edge effects for display content in a user's peripheral vision, due to the reduced resolution of outer regions of a foveated frame and/or due to the enhanced sensitivity of the human eye to edge and/or motion effects in the peripheral vision.

Aspects of the subject technology provide an edge-display operation that is applicable in any of these and/or other viewing configurations, and may thus be referred to herein as a view-invariant edge filtering operation or a view-invariant filtering operation in some examples. In one or more implementations, a view-invariant edge filtering operation may be implemented as a view-invariant anti-aliasing operation. In one or more implementations, a view-invariant filtering operation may use a filtering margin, or filter width, that is fixed in a rendered pixel value space (e.g., a warped space that is warped relative to a rectilinear display pixel space, in the foveated rendering use case). Translating this fixed margin in the rendered pixel value space to a display content space of the original display content and/or to the display pixel space of the display of a device, can allow the edge-display operation (e.g., the view-invariant edge filtering operation) described herein to address aliasing and/or other edge artifact issues in any of the various viewing conditions.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display 125 capable of presenting a visualization of an extended reality environment to a user 101. The electronic device 105 may be powered with a battery and/or any other power supply. In an example, the display 125 of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, smartphone, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating capture, storage, and/or sharing of some or all of a given extended reality environment displayed by a display of the electronic device 105. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating physical and/or virtual buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects to an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone, a portable computing device such as a laptop computer, a peripheral device that includes a touchscreen (e.g., a digital camera, headphones), a tablet device, a wearable device such as a watch, a band, and the like, any other appropriate device that includes, for example, a touchscreen, or any electronic device with a display. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic system discussed below with respect to FIG. 7. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 7.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

In one or more implementations, the display 125 of the electronic device 105 (and/or the display of any of the other electronic devices of FIG. 1) may display foveated display frames. For example, rendering and displaying foveated display frames can leverage the human eye's natural reduction in perceptual resolution in the peripheral vision, by rendering and displaying lower resolution content in the peripheral regions of a display frame, to more efficiently render and display content at the display 125.

Figure 2:
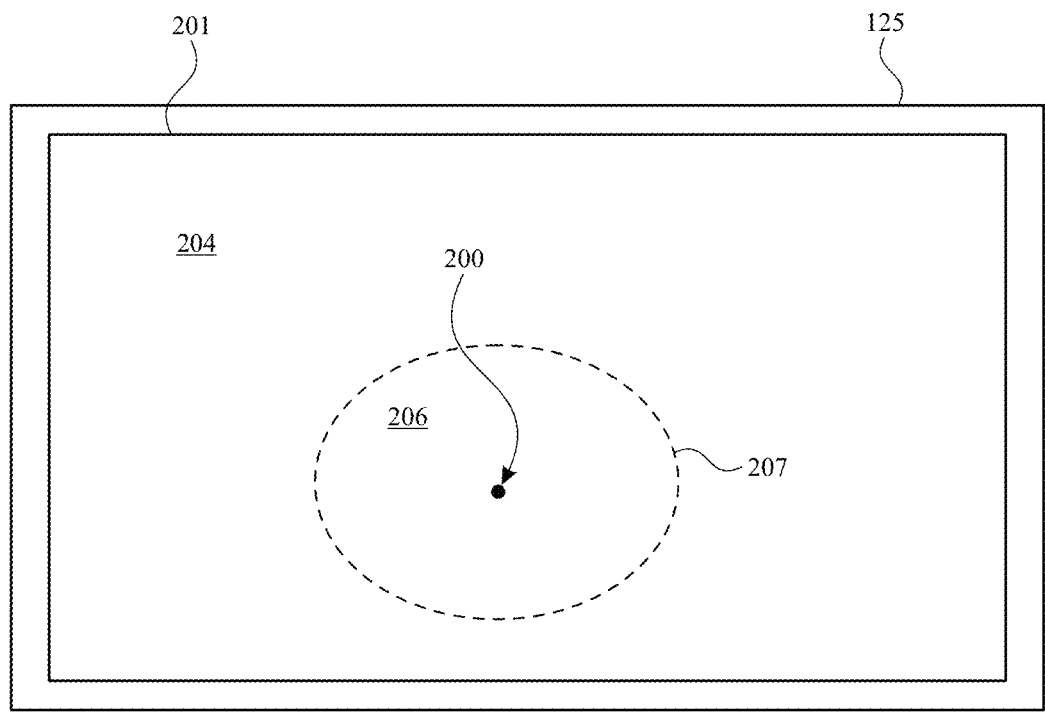
FIG. 2 illustrates an example of a foveated display frame in accordance with aspects of the subject technology.

FIG. 2 illustrates an example in which a foveated display frame 201 is displayed on the display 125. For example, in the foveated display frame 201, a portion 206 of the foveated display frame 201 has a resolution that is higher than the resolution in a portion 204 outside of a boundary 207 of the portion 206. In this example, the portion 206 of the foveated display frame 201 is centered on a gaze location 200. For example, the gaze location 200 may be a location at which a user of the electronic device 105 is gazing at the time the foveated display frame 201 is rendered and/or displayed. In one or more implementations, as the gaze location 200 moves, the electronic device 105 may track and update the locations and/or shapes of the portion 206 and the portion 204 to continue to be substantially centered on the gaze location 200. Because the user of the electronic device 105 is gazing at the gaze location 200, the reduced resolution of the portion 204 of the foveated display frame 201 may not be noticeable to the user.

In the example of FIG. 2, the boundary 207 is a curved boundary having an oval shape. However, this is merely illustrative, and the boundary 207 can be provided in any suitable shape or size (e.g., a rectangular boundary or other boundary having substantially straight boundaries). In the example of FIG. 2, the foveated display frame 201 includes a single boundary 207 between two regions of different resolution. However, in other implementations, a foveated display frame can include two or more boundaries between three or more regions of differing resolution. In one or more implementations, foveated display frames may be efficiently rendered by rendering fewer display pixel values (e.g., in the portion 206) than there are physical display pixels in the display 125. The rendered pixel values in the portion 206 can then be repeated in multiple display pixels of the display 125 to effectively expand each rendered display pixel value in the portion 206 to an area greater than a single display pixel of the display 125. In these implementations, the rendered display pixel values may be rendered into a rendered pixel value space that is different from (e.g., warped with respect to) the rectilinear space of the physical display pixels.

Figure 3:
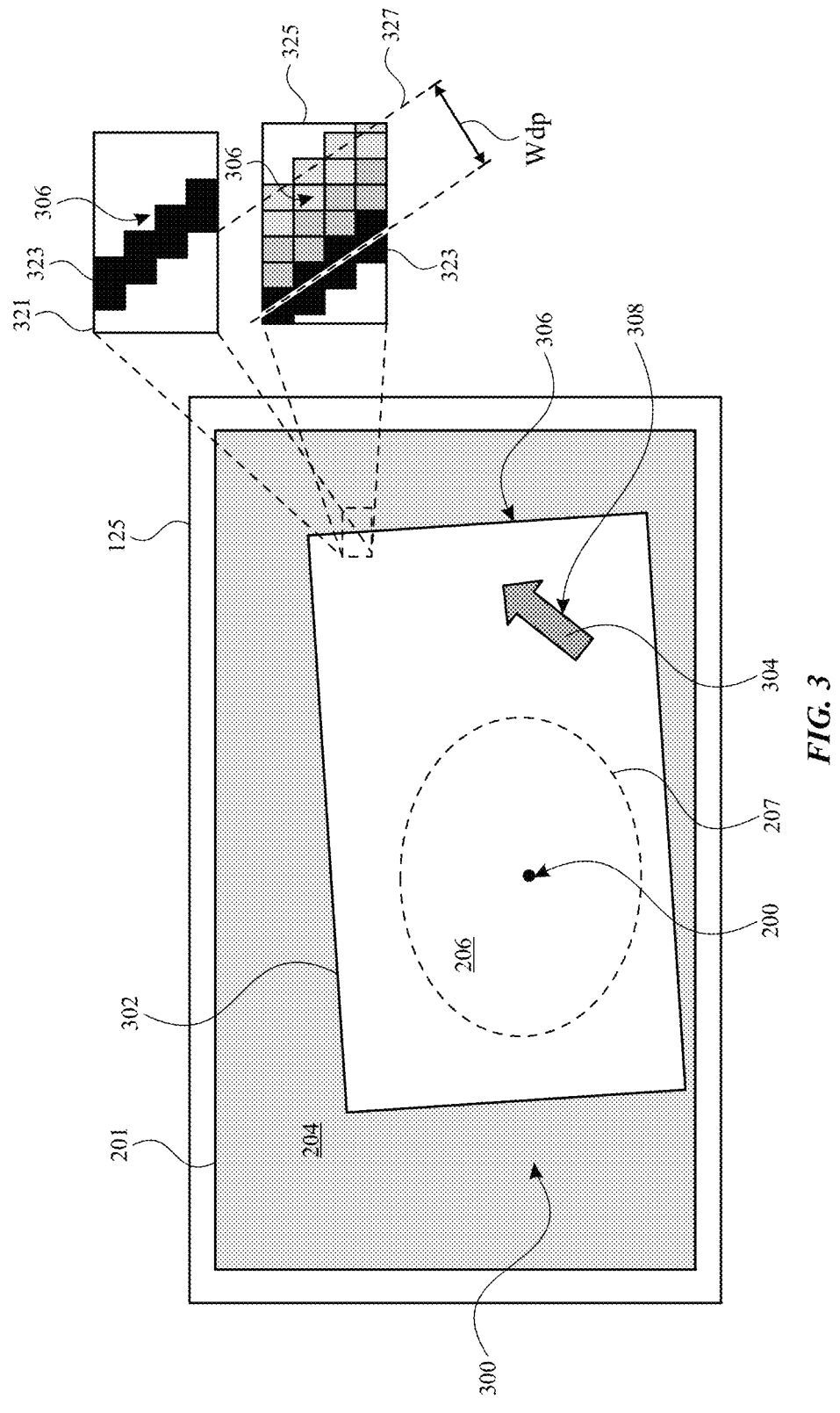
FIG. 3 illustrates an example of a foveated display frame that includes display objects having edges in accordance with aspects of the subject technology.

FIG. 3 illustrates an example in which the foveated display frame 201 includes a background 300, and one or more display objects, such as a user interface (UI) window 302 displayed over the background 300, and an element 304 of the UI window 302. In one or more other use cases, a display object such as the element 304 may be a standalone display element that is displayed, separately from the UI window 302, over the background 300. In one or more implementations, the foveated display frame 201 may include display content for an XR scene, such as an augmented reality scene, in which the background 300 is a view (e.g., a direct view or a pass-through camera view) of the physical environment of the electronic device 105.

As shown in FIG. 3, the UI window 302 may have an edge 306. The element 304 may also have an edge 308. In this example, the edge 306 of the UI window 302 forms a boundary between the UI window 302 and the background 300. In this example, the edge 308 of the element 304 forms a boundary between the UI window 302 and the element 304. FIG. 3 also shows a zoomed-in view of a portion 321 of the edge 306 in which an aliasing effect, caused by the display pixels 323 of the display 125, can be seen. As shown, the edge 306, which is intended to appear has a smooth straight line, can appear jagged or stepped due to the physical layout of the display pixels 323.

FIG. 3 also shows a zoomed-in view of a portion 325 of the edge 306 after a view-invariant filtering operation has been applied, as described in further detail hereinafter. In one or more implementations, applying a view-invariant filtering operation as described herein may cause the edge 306 to be feathered to reduce or eliminate a perceivable amount of aliasing at the edge 306. For example, in the zoomed-in view of the portion 325, the edge 306 is spread across multiple display pixels 323 within a margin 327. In this example, the edge 306 is depicted as being a dark (e.g., black) edge, and the brightness of the display pixels 323 changes (e.g., increases in a direction away from the edge into the background) across the margin 327. This can be achieved, in one illustrative example, by modifying an alpha value of the display content corresponding to the edge 306 of the UI window 302 (e.g., to modify the transparency of that layer of the display content). In various implementations, an alpha value can be provided in a separate alpha channel, or can be provided as a pre-multiplied alpha value, such as by multiplying the alpha value into the rendered pixel values (e.g., red, green, and blue pixel values in red, green, and blue channels of an image). By modifying the display pixels across the margin 327 in these or other ways, a user's perception of the jaggedness of the edge 306 displayed by the display pixels 323 (e.g., and/or related edge artifacts such as pixel crawl), can be reduced or eliminated.

In the example of FIG. 3, the margin 327 has a width, Wap, in display pixels (dp) of approximately six display pixels. However, this is merely illustrative and the width, Wdp, can be greater or less than six pixels, and can vary according to where in the foveated display frame 201 the edge 306 is located. For example, in a use case in which the edge 306 (or a portion thereof) is instead displayed in the portion 206 of the foveated display frame 201 in which the resolution is higher (and in which the user's perception of aliasing may be reduced) than in the portion 204, the electronic device 105 may modify (e.g., reduce the width of) the margin 327 across which the brightness of the display pixels 323 increases. However, because the rendered pixel value space in a foveated display use case is warped with respect to the display pixel space, the width of the margin in the rendered display pixel space may be the same whether the edge 306 is in the portion 206 or the portion 204 of the foveated display frame.

In one or more implementations, the change (e.g., increase) in brightness of the display pixels 323 across the margin 327 in the example of FIG. 3 (e.g., or more generally the alpha values across the margin 327) may follow a predetermined filtering function, such as linear function, a Gaussian function or other predetermined function. In one or more implementations, the output of the predetermined function may be an alpha value for each of one or more rendered pixel values to be displayed using the display pixels 323. For example, in one or more implementations, a rendered pixel value may include a value for each of one or more color values (e.g., red, green, and blue color values), and an alpha value that indicates the transparency of the red, green, and blue color values. As another example, in one or more other implementations, a rendered pixel value may include a value for each of one or more color values (e.g., red, green, and blue color values), each of which has been pre-multiplied by an alpha value that indicates the transparency of the red, green, and blue color values.

In the example of FIG. 3, the each rendered pixel value (e.g., each having a corresponding alpha value) is repeated across two display pixels 323 in the portion 204 of the foveated display frame 201. In this way, only a single rendered pixel value can be generated for two display pixels 323, and the electronic device can operate the display 125 using less power and computing resources than if a separate value were generated and displayed for every display pixel (e.g., in a non-foveated use case). However, the example of FIG. 3 is merely illustrative and, in a foveated display frame, more than two display pixels can display the same rendered pixel value in the portion 204 (e.g., an one display pixel can be used to display each rendered pixel value in the portion 206 of the foveated display frame).

Because the electronic device may generate fewer rendered display pixel values than there are display pixels 323 in some use cases, a space (e.g., a coordinate space) of the rendered display pixel values may be warped relative to the rectilinear display space of the display pixels 323. As described in further detail hereinafter, a view-invariant edge filtering operation can be provided, in part, by maintaining a fixed margin width in the rendered pixel value space. As described in further detail hereinafter, by mapping the fixed width margin in the rendered pixel value space to a space (e.g., a coordinate space) of the display content (e.g., a primitive for the display content including the background 300, the UI window 302 and/or the element 304), the filtering processes described herein can be applied to the foveated viewing condition illustrated in FIG. 3, and/or to other viewing conditions generated by the display 125.

Figure 4:
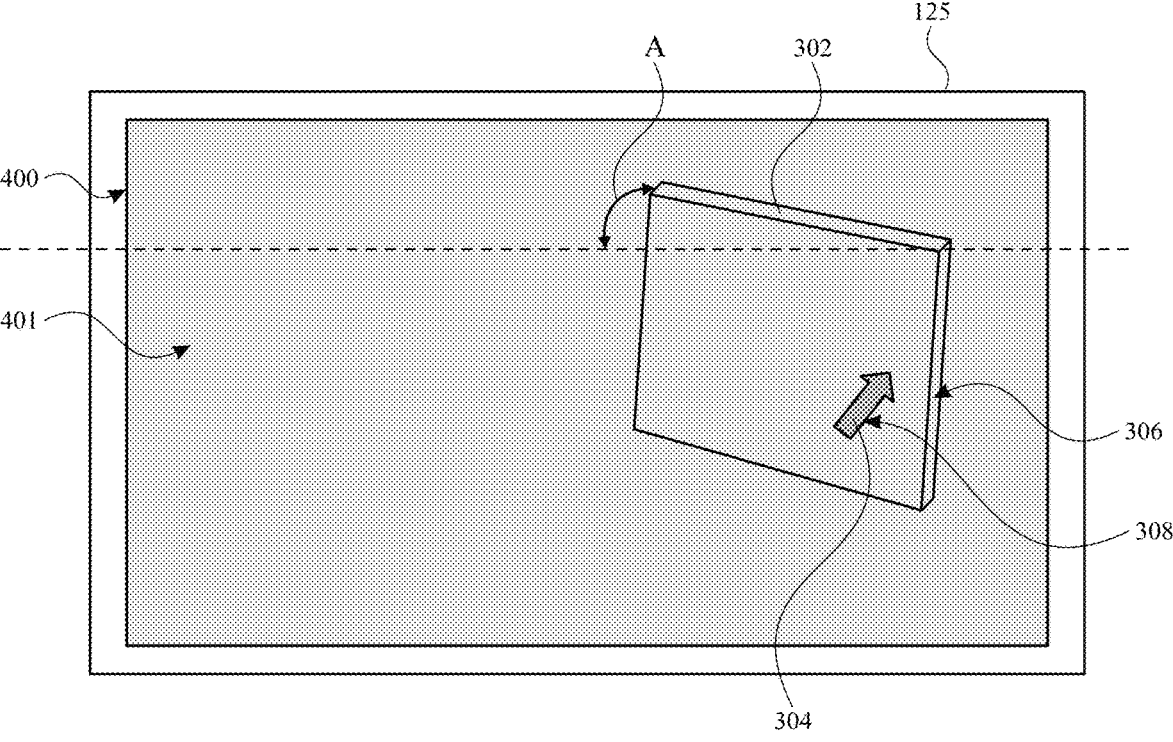
FIG. 4 illustrates an example of a display frame that includes three-dimensional display content in accordance with aspects of the subject technology.

For example, FIG. 4 illustrates another viewing condition that can be provided by the display 125, and that can benefit from the view-invariant filtering operations described herein. In the example of FIG. 4, the display 125 of the electronic device 105 displays an XR scene 400 that includes a background 401 and the UI window 302. As examples, the background 401 may be an image (e.g., a pass-through image) of a portion of the physical environment of the electronic device 105 on which the UI window 302 is overlayed, or may be a direct view of the portion of the physical environment through a portion of a transparent or translucent display on which the UI window 302 is displayed.

Figure 5:
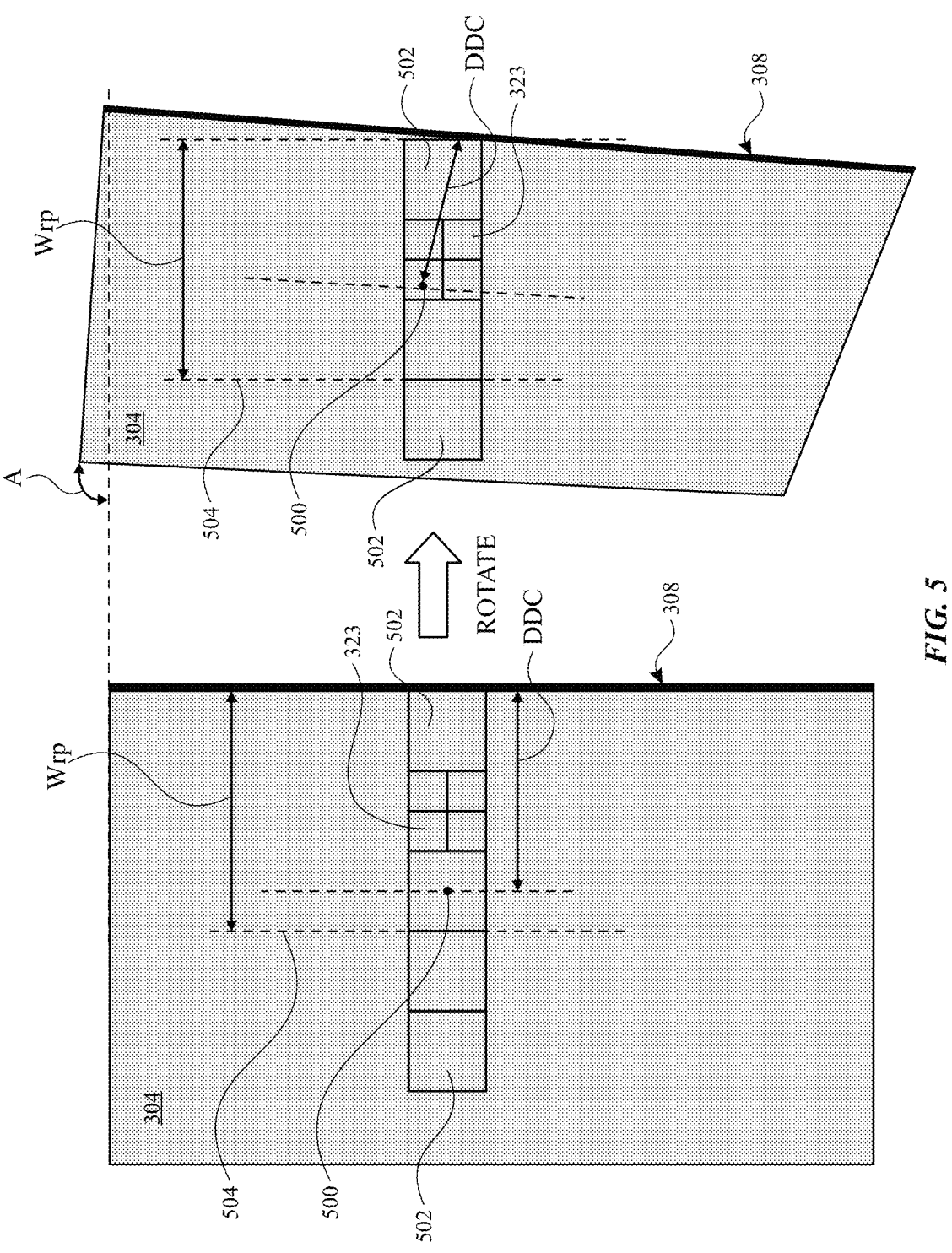
FIG. 5 illustrates a view of an edge of a display object before and after a three-dimensional rotation of the display object in accordance with aspects of the subject technology.

In the example of FIG. 4, the XR scene 400 is not depicted as being foveated as in the example of FIG. 3. However, in one or more implementations, the XR scene 400 may be generated with a foveated rendering. As shown in FIG. 4, in one or more viewing configurations, a display object such as the UI window 302 or the element 304 may be displayed at a non-normal viewing angle A, such that the display object appears to be a three-dimensional object in the XR scene 400. In the example of FIG. 5, the UI window 302 is depicted as a three-dimensional window having depth and being angled to extend partially away from the viewer into the background 401. Increasing or decreasing the viewing angle, A, in FIG. 5 would cause the UI window 302 and the element 304 to span, respectively, fewer or more display pixels on the display 125 (and to span, respectively, fewer or more rendered pixel values). Accordingly, the effectiveness of performing a filtering operation on the edge 306 or the edge 308 (e.g., for anti-aliasing) may be affected by the viewing angle A. It is also appreciated that varying the viewing distance to a display object such as the UI window 302 or the element 304 (e.g., by displaying the display object to appear to be further from, or closer to, the viewer in three-dimensions) will also cause the display object to span a varying number of display pixels (and a varying number of rendered pixel values). Accordingly, the effectiveness of performing a filtering operation on the edge 306 or the edge 308 (e.g., for anti-aliasing) may also be affected by the viewing distance (e.g., a perceived distance, remote from the display, between the user's eyes and the display object) to a display object. As discussed in further detail hereinafter, the view-invariant edge filtering operations described herein provide edge filtering that is effective (e.g., for anti-aliasing) at any of various viewing angles and/or viewing distances (e.g., and/or in a foveated or non-foveated rendering).

FIG. 5 illustrates an example of how a change in the viewing angle of the element 304 can affect the number of rendered display pixel values and/or the number of physical display pixels spanned by a portion of the element 304. In the example of FIG. 5, a zoomed-in view of a portion of the element 304 at the edge 308 of the element 304 is shown. As illustrated in FIG. 5, a portion 500 of the display content of the element 304 may be located at a distance (in display content space), DDC, from the edge 308 of the element 304. For example, the portion 500 may be a fragment of a primitive corresponding to the display content in some implementations. In various use cases, the display content for the element 304 may be provided by an application or a system process. Various applications and/or system processes can describe a display content space (e.g., including the distance in display content space, DDC) of display content generated by that process in any of various units (e.g., a normalized space in which the axes of the display content space extend from values of zero to values of one, or any other display-content-specific coordinate units).

In this example, the location of the portion 500 of the display content is two and half rendered pixel values 502 from the edge 308 in rendered pixel value space. In this example, the edge 308 is located in an outer (e.g., low resolution) region of a foveated display frame, and each of the rendered pixel values 502 spans (e.g., is displayed by) four display pixels 323 of the display 125. In other foveation schemes and/or if the edge 308 is located in other portions of a foveated display frame, the rendered pixel value 502 may span (e.g., be displayed by more or fewer than four display pixels 323). In the example of FIG. 5, a margin 504, in rendered pixel value space, has a fixed width, $W_{rp}$, (in the rendered pixel (rp) value space) of three rendered pixel values. In this example, the portion 500 of the display content of the element 304 is within the fixed margin 504 and may be assigned an alpha value between zero and one based on the distance of the portion 500 from the edge 308. However, in order to determine the alpha value in a view-invariant manner (e.g., a manner that is applicable in any of the various viewing conditions described herein), the fixed width, $W_{rp}$, (in rendered pixel space) may be transformed or otherwise converted into a width in the display content space of the display content. This can be performed by obtaining a derivative of the distance (in display content space), DDC, with respect to the rendered pixel value space, and applying the derivative to the fixed width, $W_{rp}$, to obtain a filter width for a predetermined filter function in display content space. The distance in display content space, DDC, may then be provided as an input to the predetermined filter function with the obtained filter width in display content space.

In this way, the fixed width, $W_{rp}$, in rendered pixel space can remain invariant, and the predetermined filter function can be applicable, even when the viewing condition of the display content changes. For example, FIG. 5 illustrates a rotation of the element 304 in three-dimensions that causes the distance in display content space, DDC, of the portion 500 of the display content of the element 304 to span a different number of rendered pixel values 502 and a different number of display pixels 323. In this example, following the rotation, the distance in display content space, DDC, is less than two rendered pixel values 502 from the edge 308, and less than four display pixels 323 from the edge 308. However, by keeping the fixed width, $W_{rp}$, in the rendered pixel value space invariant, and performing the edge filtering operations as described herein, the amount of the display content that is affected by the edge filtering operation can naturally adapt to the change in the viewing condition (e.g., the change in the three-dimensional viewing angle in this use case).

FIG. 6 illustrates a flow diagram of an example process for view-invariant filtering according to aspects of the subject technology. The blocks of process 600 are described herein as occurring in serial, or linearly. However, multiple blocks of process 600 may occur in parallel. In addition, the blocks of process 600 need not be performed in the order shown and/or one or more blocks of process 600 need not be performed and/or can be replaced by other operations.

In the example of FIG. 6, at block 602, a device, such as the electronic device 105, may obtain display content to be displayed by the device for three-dimensional viewing in any of various viewing configurations. The display content may include a display object (e.g., a UI window such as UI window 302 and/or another display element such as element 304) having an edge (e.g., edge 306 or edge 308). For example, the various viewing conditions may include at least one of a foveated rendering of the display content (e.g., as in the example of FIG. 3), a (e.g., variable) viewing angle of a three-dimensional perspective view of the display object (e.g., as in the example of FIGS. 4 and 5), or a (e.g., variable) viewing distance of the display object. In one or more implementations, obtaining the display content may include obtaining display content for three-dimensional viewing in a first viewing configuration and a second viewing configuration that is different than the first viewing configuration.

At block 604, the device may apply a view-invariant filtering operation (e.g., a view-invariant edge filtering operation such as view-invariant anti-aliasing operation) to the edge of the display object. For example, the view-invariant filtering operation may be a filtering operation that has an invariance across the various viewing configurations. For example, the view-invariant filtering operation may be applied to generate (e.g., feathered) rendered pixel values (e.g., rendered pixel values 502) within a fixed width margin (e.g., margin 504 having a fixed width, $W_{rp}$) in a rendered pixel value space. The fixed width margin in rendered pixel value space may be, or correspond to, the invariance across the various viewing configurations. For example, applying the view-invariant filtering operation may include determining alpha values (e.g., transparency values) for the (e.g., feathered) rendered pixel values using a predetermined filter function. In one or more implementations, for each rendered pixel value, the predetermined filter function may be a function of a distance of the rendered pixel value to the edge of the display object. In one or more implementations, the view-invariant filtering operation may be based at least in part on a derivative of distance in a display content space of the display content with respect to a distance in a pixel space (e.g., a rendered pixel value space which may be the same as, or different from (e.g., warped with respect to) a physical display pixel space). For example, the derivative may be used to determine a filter width of the view-invariant filtering operation.

In one or more implementations, applying the view-invariant filtering operation may include obtaining a distance, to the edge of the display object, of a location of a portion (e.g., portion 500, such as a fragment) of the display content in a display content space (e.g., by obtaining the distance in display content space, DDC, as described in connection with FIG. 5). Applying the view-invariant filtering operation may also include obtaining a derivative of the distance in the display content space with respect to the distance in the rendered pixel value space. For example, obtaining the distance in the display content space may include obtaining the distance using a signed distance field (e.g., a two-dimensional signed distance field or a three-dimensional signed distance field). In one or more implementations, obtaining the distance may include performing an iterative distance measuring operation along the edge of the display object. In one or more implementations, obtaining the distance in the display content space may include obtaining a previously stored attribute for the display object (e.g., a previously computed distance stored, for example, in three-dimensional geometry vertex data of the display object).

Applying the view-invariant filtering operation may also include setting a filter width of the predetermined filter function in the display content space using the derivative and the fixed width margin (e.g., with width $W_{rp}$) in the rendered pixel value space (e.g., by multiplying the derivative by the fixed width margin in the rendered pixel value space). Applying the view-invariant filtering operation may also include determining one of the alpha values of a respective one of the rendered pixel values corresponding to the fragment of the display content, using the distance in the display content space as an input to the predetermined filter function with the filter width in the display content space. For example, an output of the predetermined filter function may be an alpha value for a pixel value to be rendered. In one or more implementations, the predetermined filter function may be a linear function of the distance, a Gaussian function of the distance, or any other predetermined function that causes the output alpha values to fade or feather the rendered pixel values across the margin with the determined width in display content space (e.g., across the fixed width margin in the rendered pixel value space). In one or more implementations, the view-invariant filtering operation may have an invariance across first and second viewing configurations for the display content, the second viewing configuration different from the first viewing configurations.

At block 606, the device may display, in at least one of various viewing configurations, the display content with the view-invariant filtering operation applied. For example, displaying the display content with the view-invariant filtering operation applied in the at least one of the various viewing configurations may include displaying the rendered pixel values (e.g., rendered pixel values 502) that are within the fixed width margin in the rendered pixel value space, using a variable number of display pixels (e.g., display pixels 323) of a display (e.g., display 125) of the device, the variable number of display pixels being based on the at least one of the plurality of viewing configurations (e.g., based on the location in a foveated display frame).

In one or more implementations, displaying the display content may include displaying, in at least one of first or second viewing configurations, the display content with the view-invariant filtering operation applied. In one or more implementations, the process 600 may also, or alternatively, include displaying the display content in at least the other of the first or second viewing configurations, the display content having had the view-invariant filtering operation applied. For example, in one example use case, the first viewing configuration may include a foveated viewing configuration of the display content (e.g., a foveated display frame as described herein in connection with FIG. 3), the second viewing configuration may include a three-dimensional perspective viewing configuration of at least a portion of the display content (e.g., as described herein in connection with FIG. 5), and displaying the display content with the view-invariant filtering operation applied in the at least one of the first or second viewing configurations may include displaying the display content with the view-invariant filtering operation applied concurrently in both the first and second viewing configurations (e.g., displaying a UI window or other display element in a three-dimensional perspective view within a foveated display frame).

In one or more use cases, the process 600 may include displaying the display content with the view-invariant filtering operation applied at a first perceived three-dimensional distance from a user of the device and at a first perceived three-dimensional viewing angle with respect to the user, and then (e.g., responsive to a user request or user input) displaying the display content with the view-invariant filtering operation applied at a second, different, perceived three-dimensional distance from a user of the device and/or at a second, different, perceived three-dimensional viewing angle with respect to the user. In these use cases, the view-invariant filtering operation (e.g., having the same fixed filter width in rendered pixel value space) may be applied to the display content in both the first perceived three-dimensional distance and the first perceived three-dimensional viewing angle and in the second, different, perceived three-dimensional distance and/or second, different, perceived three-dimensional viewing angle. As described herein, by obtaining the distance in display content space and the derivative of the distance in display content space with respect to the rendered pixel value space, and keeping the filter width fixed in the rendered pixel value space, the view-invariant filtering operation can reduce or eliminate an aliasing effect at an edge of the display object in both the first perceived three-dimensional distance and the first perceived three-dimensional viewing angle and the second, different, perceived three-dimensional distance and/or second, different, perceived three-dimensional viewing angle.

In one or more use cases, displaying the display content with the view-invariant filtering operation applied in the at least one of the various viewing configurations may include displaying each of the (e.g., feathered) rendered pixel values that are within the fixed width margin in the rendered pixel value space, using a first number of display pixels of a display of the electronic device, and by displaying at least one other (e.g., non-feathered) rendered pixel value outside the fixed width margin (e.g., in a central region of a foveated display frame) in the rendered pixel value space with a second number of display pixels different from the first number of display pixels. For example, the second number of display pixels may be one display pixel and the first number of display pixels may be more than one display pixel.

As described herein, aspects of the subject technology can provide an edge-display operation such as an anti-aliasing operation that is effective across various different viewing configurations of a displayed object, including in any of various three-dimensional display viewing configurations. For example, a wider antialiasing margin may be used in outer regions of a foveated rendering, to account for both the larger effective pixel size in the outer regions and for the increased sensitivity of the human eye to aliasing in the peripheral vision. As another example, anti-aliasing may be applied to more or less of the display content of a three-dimensional object for display, depending on the three-dimensional viewing angle of the object relative to a user.

As described above, aspects of the subject technology may include the collection and transfer of data. The present disclosure contemplates that in some instances, this collected data may include personal information data that uniquely identifies or can be used to identify a specific person. Such personal information data can include demographic data, location-based data, images, gaze information, gesture information, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in a providing view-invariant edge filtering. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing view-invariant edge filtering, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 7:
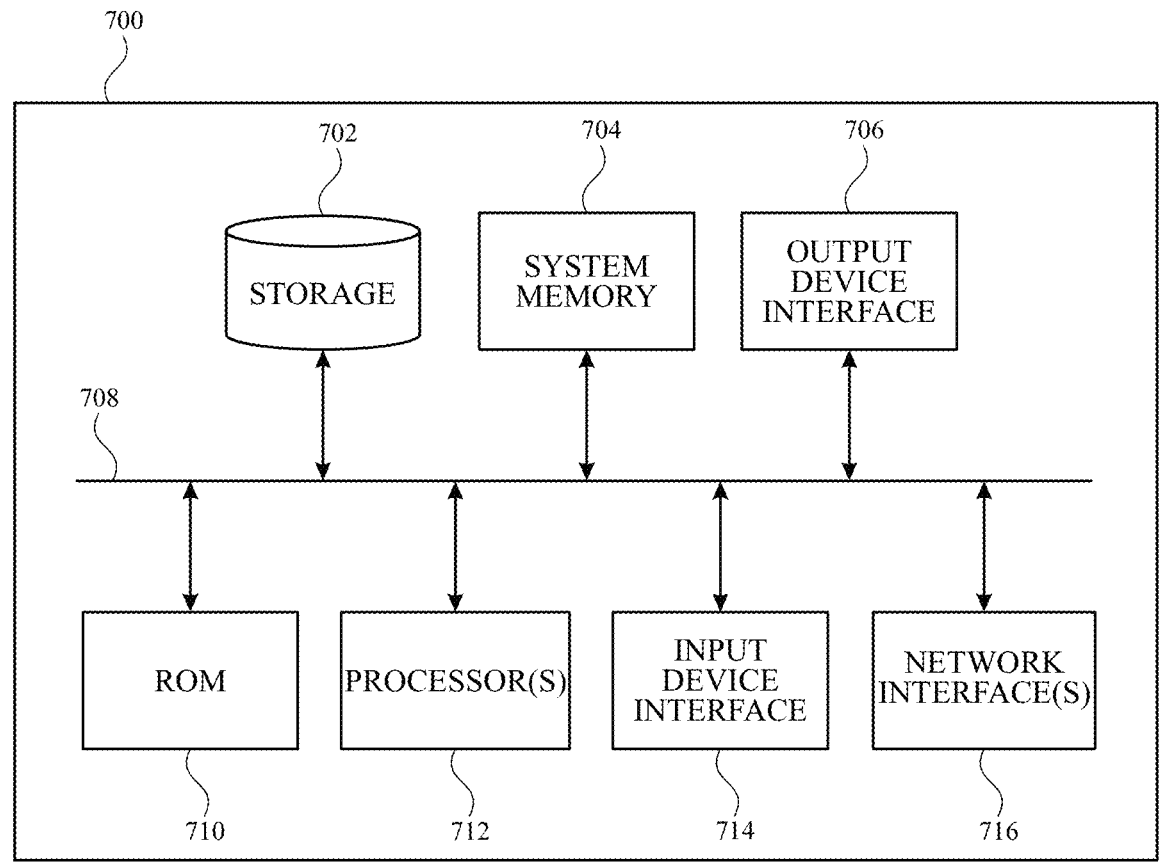
FIG. 7 illustrates an example computing device with which aspects of the subject technology may be implemented.

FIG. 7 illustrates an example computing device with which aspects of the subject technology may be implemented in accordance with one or more implementations. The computing device 700 can be, and/or can be a part of, any computing device or server for generating the features and processes described above, including but not limited to a laptop computer, a smartphone, a tablet device, a wearable device such as a goggles or glasses, and the like. The computing device 700 may include various types of computer readable media and interfaces for various other types of computer readable media. The computing device 700 includes a permanent storage device 702, a system memory 704 (and/or buffer), an input device interface 706, an output device interface 708, a bus 710, a ROM 712, one or more processing unit(s) 714, one or more network interface(s) 716, and/or subsets and variations thereof.

The bus 710 collectively represents all system, peripheral, and chipset buses that communicatively connect the numerous internal devices of the computing device 700. In one or more implementations, the bus 710 communicatively connects the one or more processing unit(s) 714 with the ROM 712, the system memory 704, and the permanent storage device 702. From these various memory units, the one or more processing unit(s) 714 retrieves instructions to execute and data to process in order to execute the processes of the subject disclosure. The one or more processing unit(s) 714 can be a single processor or a multi-core processor in different implementations.

The ROM 712 stores static data and instructions that are needed by the one or more processing unit(s) 714 and other modules of the computing device 700. The permanent storage device 702, on the other hand, may be a read-and-write memory device. The permanent storage device 702 may be a non-volatile memory unit that stores instructions and data even when the computing device 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 714 may need at runtime. In one or more implementations, the processes of the subject disclosure are stored in the system memory 704, the permanent storage device 702, and/or the ROM 712. From these various memory units, the one or more processing unit(s) 714 retrieves instructions to execute and data to process in order to execute the processes of one or more implementations.

The bus 710 also connects to the input and output device interfaces 706 and 708. The input device interface 706 enables a user to communicate information and select commands to the computing device 700. Input devices that may be used with the input device interface 706 may include, for example, alphanumeric keyboards and pointing devices (also called "cursor control devices"). The output device interface 708 may enable, for example, the display of images generated by computing device 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 710 also couples the computing device 700 to one or more networks and/or to one or more network nodes through the one or more network interface(s) 716. In this manner, the computing device 700 can be a part of a network of computers (such as a LAN, a wide area network ("WAN"), or an Intranet, or a network of networks, such as the Internet. Any or all components of the computing device 700 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An electronic device, comprising:
a memory; and
one or more processors configured to:
obtain display content to be displayed by the electronic device for three-dimensional viewing in a first viewing configuration and a second viewing configuration that is different than the first viewing configuration, the display content including a display object having an edge, wherein the first and second viewing configurations include a foveated rendering of the display content and a viewing angle of a three-dimensional perspective view of the display object;
apply a view-invariant filtering operation to the edge of the display object; and
display, in at least one of the first or second viewing configurations, the display content with the view-invariant filtering operation applied.

2. The electronic device of claim 1, wherein the one or more processors are further configured to display, in at least the other of the first or second viewing configurations, the display content with the view-invariant filtering operation applied.

3. The electronic device of claim 2, wherein the first viewing configuration comprises the foveated rendering of the display content, the second viewing configuration comprises the three-dimensional perspective view of the display content, and wherein the one or more processors are further configured to display the display content with the view-invariant filtering operation applied in the at least one of the first or second viewing configurations by displaying the display content with the view-invariant filtering operation applied concurrently in both the first and second viewing configurations.

4. The electronic device of claim 1, wherein the view-invariant filtering operation is applied to generate feathered rendered pixel values within a fixed width margin in a rendered pixel value space.

5. The electronic device of claim 4, wherein the one or more processors are configured to display the display content with the view-invariant filtering operation applied in the at least one of the first and second viewing configurations by displaying each of the feathered rendered pixel values that are within the fixed width margin in the rendered pixel value space, using a first number of display pixels of a display of the electronic device, and by displaying at least one other rendered pixel value outside the fixed width margin in the rendered pixel value space with a second number of display pixels different from the first number of display pixels.

6. The electronic device of claim 5, wherein the second number of display pixels is one display pixel and the first number of display pixels is more than one display pixel.

7. The electronic device of claim 4, wherein the one or more processors are configured to apply the view-invariant filtering operation at least in part by determining alpha values of the feathered rendered pixel values using a predetermined filter function, and wherein, for each feathered rendered pixel value, the predetermined filter function is a function of a distance of the feathered rendered pixel value to the edge of the display object.

8. The electronic device of claim 7, wherein the one or more processors are configured to apply the view-invariant filtering operation by:

obtaining a distance, to the edge of the display object, of a location of a fragment of the display content in a display content space;

obtaining a derivative of the distance in the display content space with respect to the distance in the rendered pixel value space;

setting a filter width of the predetermined filter function in the display content space using the derivative and the fixed width margin in the rendered pixel value space; and determining one of the alpha values of a respective one of the feathered rendered pixel values corresponding to the fragment of the display content, using the distance in the display content space as an input to the predetermined filter function with the filter width in the display content space.

9. A non-transitory computer-readable medium storing instructions which, when executed by one or more processors, cause the one or more processors to:

obtain display content to be displayed by a device for three-dimensional viewing in any of a plurality of viewing configurations, the display content including a display object having an edge, wherein the plurality of viewing configurations include a foveated rendering of the display content and a viewing angle of a three-dimensional perspective view of the display object;

apply, by the device, a filtering operation to the edge of the display object, the filtering operation having an invariance across the plurality of viewing configurations; and display, by the device in at least one of the plurality of viewing configurations, the display content with the filtering operation applied.

10. The non-transitory computer-readable medium of claim 9, wherein the plurality of viewing configurations further include
a viewing distance of the display object.

11. The non-transitory computer-readable medium of claim 9, wherein the filtering operation is applied to generate rendered pixel values within a fixed width margin in a rendered pixel value space.

12. The non-transitory computer-readable medium of claim 9, wherein the filtering operation is based at least in part on a derivative of distance in a display content space of the display content with respect to a distance in a pixel space.

13. A method, comprising:

obtaining display content to be displayed by a device for three-dimensional viewing in any of a plurality of viewing configurations, the display content including a display object having an edge, wherein the plurality of viewing configurations include a foveated rendering of the display content and a viewing angle of a three-dimensional perspective view of the display object;

applying, by the device, a view-invariant filtering operation to the edge of the display object; and displaying, by the device in at least one of the plurality of viewing configurations, the display content with the view-invariant filtering operation applied.

14. The method of claim 13, wherein the plurality of viewing configurations further include
a viewing distance of the display object.

15. The method of claim 13, wherein the view-invariant filtering operation is applied to generate rendered pixel values within a fixed width margin in a rendered pixel value space.

16. The method of claim 15, wherein displaying the display content with the view-invariant filtering operation applied in the at least one of the plurality of viewing configurations comprises displaying the rendered pixel values that are within the fixed width margin in the rendered pixel value space, using a variable number of display pixels of a display of the device, the variable number of display pixels being based on the at least one of the plurality of viewing configurations.

17. The method of claim 15, wherein the applying the view-invariant filtering operation comprises determining alpha values for the rendered pixel values using a predetermined filter function.

18. The method of claim 17, wherein, for each rendered pixel value, the predetermined filter function is a function of a distance of the rendered pixel value to the edge of the display object.

19. The method of claim 18, wherein applying the view-invariant filtering operation comprises:

obtaining a distance, to the edge of the display object, of a location of a fragment of the display content in a display content space;

obtaining a derivative of the distance in the display content space with respect to the distance in the rendered pixel value space;

setting a filter width of the predetermined filter function in the display content space using the derivative and the fixed width margin in the rendered pixel value space; and determining one of the alpha values of a respective one of the rendered pixel values corresponding to the fragment of the display content, using the distance in the display content space as an input to the predetermined filter function with the filter width in the display content space.

20. The method of claim 19, wherein obtaining the distance in the display content space comprises obtaining the distance using a signed distance field.

21. The method of claim 19, wherein obtaining the distance in the display content space comprises obtaining a previously stored attribute for the display object.

\* \* \* \* \*